Oct. 8, 1940.  W. G. BALDENHOFER  2,216,800
HYDRAULIC CONTROL DEVICE
Filed May 22, 1939   2 Sheets-Sheet 1
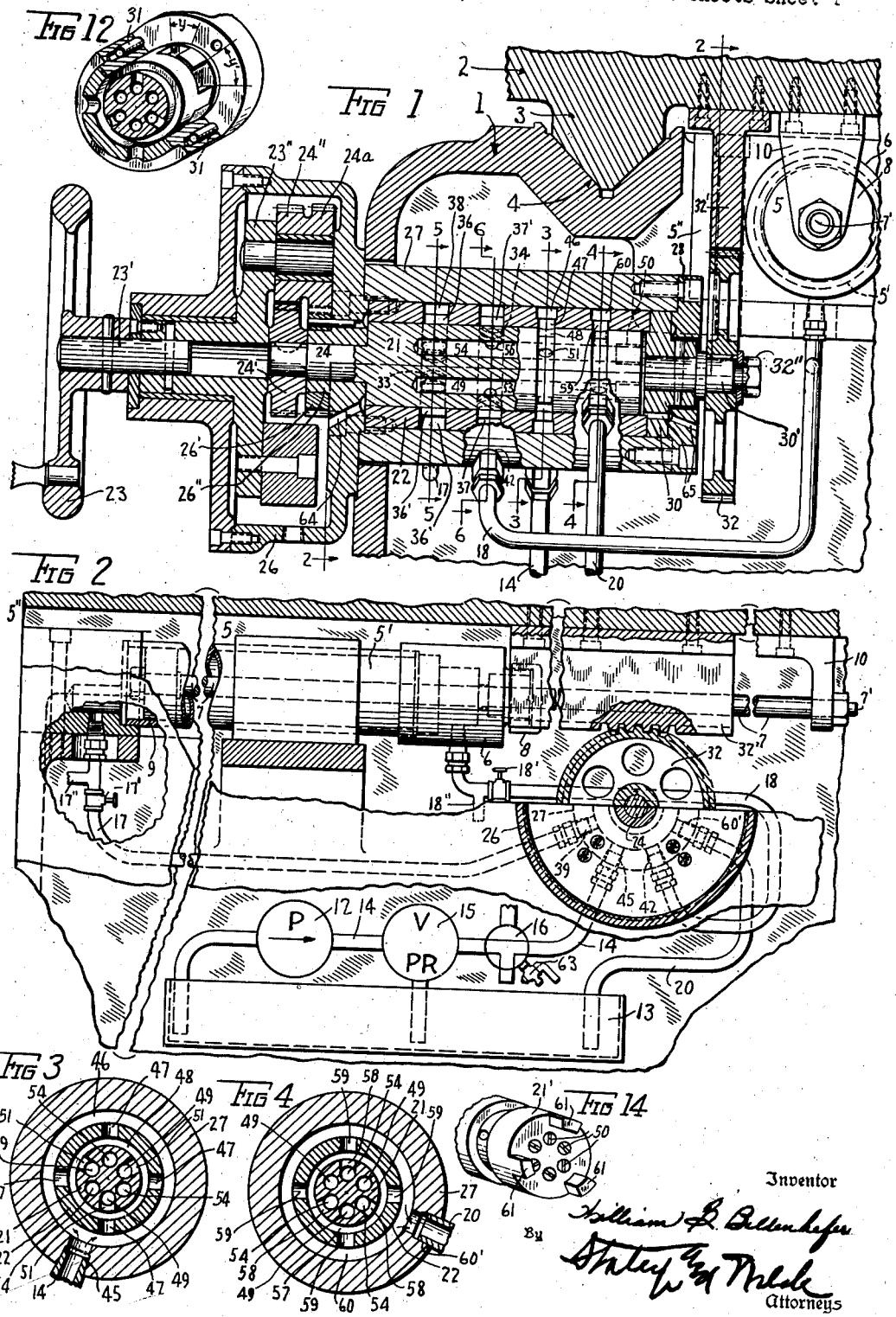
Inventor
William G. Baldenhofer
By
Attorneys

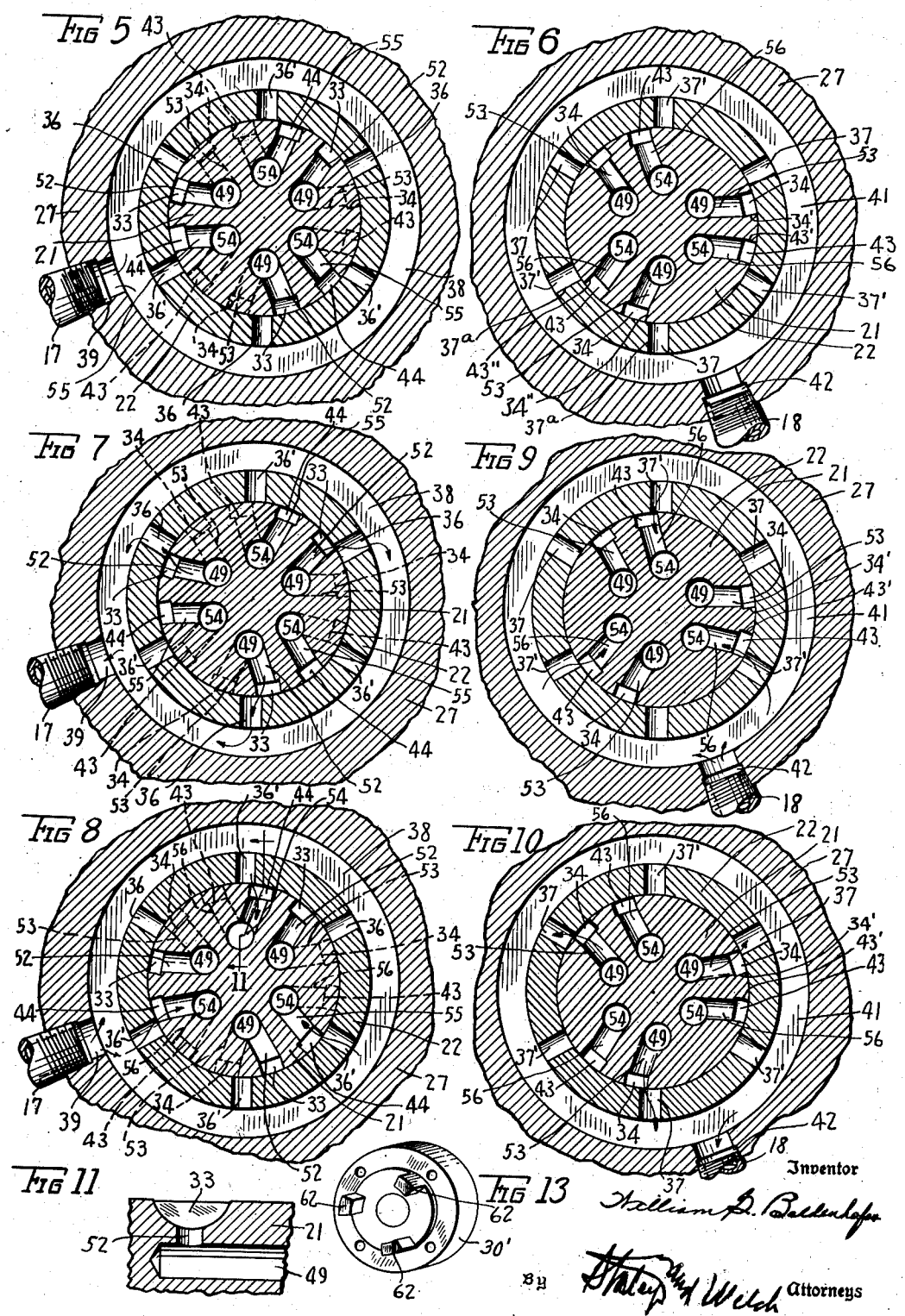

Patented Oct. 8, 1940

2,216,800

UNITED STATES PATENT OFFICE 2,216,800

HYDRAULIC CONTROL DEVICE

William G. Baldenhofer, Springfield, Ohio, assignor to The Thompson Grinder Company, Springfield, Ohio, a corporation of Ohio Application May 22, 1939, Serial No. 274,900

3 Claims. (Cl. 121—45)

This invention relates to hydraulic controlling devices and as shown and described it is especially applicable to installation in the fluid pressure systems of hydraulically-operated machine tools, the invention being particularly adaptable to the manual control of the movements of a movable member such as the work-table of a grinding machine.

Referring to prior machine tool designs, it is practically a universal procedure to provide arrangements such as the well known form of screw and hand wheel mechanism for the movement of these parts. From a very early date in machine tool design rotary movement of a hand wheel and crank has been translated by these screw arrangements into movements of a member in a desired lineal direction. Thus, it is almost invariably the case that clock-wise rotation of a hand wheel causes a movement of the part to the right, and in a similar manner anti-clock-wise rotation of a hand wheel produces a movement to the left of the operator. Also, in parts that are to be moved away from or toward the operator, or which are to be elevated or lowered, clock-wise rotation produces movement away from the operator or elevates the part with reference to vertical movement, and anti-clockwise rotation brings the part nearer the operator or lowers the movable part, referring to movement in a vertical direction.

While power-operated devices for the purpose of feeding the tool into the work and vice-versa have been in use for a number of years, it is still customary to resort to manual control for such operation as tool setting. As parts became heavier the demand on the physical strength and endurance of the operator increased to the extent that operator-fatigue became a factor tending to limit the output of a machine.

An object of the invention is to provide an improved device of this character, the construction of which will permit the maintenance of a suitable degree of pressure on the fluid motor at all times, not only while the machine is at rest but also during the time the movable part is in motion. This is brought about by providing that the entering fluid admitted to the working side of the fluid motor is always subject to exhaust port resistances; that is, no more fluid may enter than is being displaced from the opposite side. This places the fluid motor under a sort of hydraulic lock which is of advantage in preventing a movement of the part such as might be caused by an external force.

The advantage obtained by this construction is that there is provided a control over exhaust fluid flows in comparison with prior hydraulic circuits which results in the reduction of the extent of any final movement made by the movable member after the fluid supply is shut off. By this final movement is meant a movement of the parts after the controlling valve (of any previously known type) is closed which movement is traceable to a release or reduction of tension in the conduit arrangements, sometimes including the fluid motor itself. This movement is more noticeable in those hydraulic systems in which a comparatively long resilient piping or conduit arrangement is employed, since with comparatively high pressure the stressed condition of the conduit arrangement acts as a spring to return a slight amount of power which causes the final movement mentioned after the controlling valve is closed. With the present device this final movement is reduced in extent by the simple expedient of controlling the exhaust flow and thus keeping the conduit arrangement under tension by maintaining pressures thereon.

Other objects and advantages will appear from the accompanying drawings, specification and claims.

In the accompanying drawings:

Fig. 1 is a view partly in elevation and partly in transverse section of so much of a typical machine as is needed to show the application of the invention to the machine, the sectional view being taken on the line 1—1 of Fig. 2.

Fig. 2 is a view partly in elevation and partly in longitudinal section on a reduced scale, the sectional portion being taken on the line 2—2 of Fig. 1.

Fig. 3 is a sectional view taken on the line 3—3 of Fig. 1 through the device itself and may therefore be regarded as a transverse sectional view. This also applies to several following views.

Fig. 4 is a sectional view on the line 4—4 of Fig. 1.

Fig. 5 is an enlarged sectional view on the line 5—5 of Fig. 1, showing a companion pair of internal parts in one working position.

Fig. 6 is an enlarged sectional view on the line 6—6 of Fig. 1, showing the same companion pair in one of its working positions.

Fig. 7 is an enlarged sectional view similar to Fig. 5 showing the companion pair of parts in another working position.

Fig. 8 is an enlarged sectional view similar to Figs. 5 and 7 but with the parts in a still different working position.

Fig. 9 is an enlarged sectional view similar to

Fig. 6 with the parts in a different working position as compared with Fig. 6.

Fig. 10 is an enlarged sectional view similar to Figs. 6 and 9 with the parts in a still different working position.

Fig. 11 is a longitudinal sectional view on the line 11—11 of Fig. 7.

Fig. 12 is a fragmentary perspective view with portions broken away of details employed in a modified form of the invention. In general the scale is the same as in Fig. 1.

Fig. 13 is a partial perspective view of a detail employed in the modified form on the same scale as Fig. 12.

Fig. 14 is a partial view in perspective of a detail that coacts with the detail shown in Fig. 13 in the modified form. The scale of this view is also the same as Figs. 12 and 13.

Referring to the drawings, a portion of the base is indicated at 1. On this base 1 there is mounted for sliding movement from left to right and vice versa a machine element, a portion only of which is shown, such as the work-table 2 of a grinding machine carried on well known forms of ways, one of which, a V-way is indicated at 3 fitted in a V-way 4 of the base 1.

When referring hereafter to any machine element movable by a fluid-motor under control of the improved hand feed device, the element will be simply termed "the work-table".

To relieve the operator of the actual labor of maneuvering the work-table 2 there is provided a fluid-motor 5 comprising a cylinder 5' secured at one end 5'' to the left end of the base 1. At the opposite end of the cylinder is the gland head 6 through which passes the piston rod 7 through the usual gland 8. On the inner end of the piston rod 7 there is fixed the piston 9, while the outer end 7' of the piston rod 7 is attached to a depending bracket 10 secured to the underside of the right hand end of the work-table 2. As seen in Figs. 1 and 2, the longitudinal axes of the cylinder 5' and piston rod 7 are parallel to the line of motion of the work-table as represented by the V-way 3.

Power for the operation of the work-table under the control of the improved device is furnished by the pump 12 shown diagrammatically in Fig. 2.

The pump 12 takes its suction from the reservoir 13. From the discharge side of the pump a conduit 14 leads to the device through an intervening pressure regulating and relief valve 15 and a three-way valve 16, the function of which will appear later. From the control device the fluid supply to the fluid motor 5 branches to provide the conduits 17 and 18 leading to the left and right hand ends respectively of the fluid motor with valves 17' and 18' interposed in the conduits 17 and 18 as seen in Fig. 2. An exhaust conduit 20 is provided leading from the control device to return the exhaust fluid to the storage reservoir 13.

To perform the function of controlling work-table movements in a manner in which a rotary crank or hand-wheel is employed, the feed device consists of two revoluble main parts, the manually rotatable hand or pilot valve 21 and the complemental rotary follow-valve 22. Hereafter in all references to the valves 21 and 22, the terms "pilot valve" and "follow valve", respectively, will be used.

The pilot valve 21 is manually rotatable in either direction of rotation through the medium of a gear train that is set in motion by any means such as by a hand wheel 23. In the present case the gearing is shown only in Fig. 1 and the description thereof is limited in detail as any suitable type of gearing may be employed if desired. In practice the type of work to be performed by the aid of the improved device determines the form and ratio any gearing may take. It should be understood also that in some applications satisfactory results are obtainable with no gearing, a direct connection being had with the pilot valve 21 itself.

When gearing is used as in the present case it is mainly for the purpose of providing sensitiveness in work-table movements. For example, it might prove to be difficult with a directly connected arrangement as mentioned, for the operator to bring about a work-table linear movement, say as small as .005'' because the partial rotation of the hand wheel would then necessarily also be very small. With the step-down gearing shown the control is more sensitive, since in this case the hand wheel would be revolved through a partial rotation, the angle of which may be on the order of ten to fifteen degrees.

Rotary motion of the hand wheel 23 is transmitted to the pilot valve 21 by the gearing shown enclosed in the gear casing 26. The gearing is of the form sometimes known as "epicyclic" and was selected simply because with this form a comparatively large ratio is obtainable with few parts, and further it permits the central positioning of the hand wheel 23 with respect to the device.

The hand wheel is secured to a short shaft 23' which in turn is secured in the centrally disposed bore in a disk-like member 23'' rotatably supported on the inner side of the cover plate of the gear casing 26. At a suitable distance or radius from the axis of rotation of the disk 23'' is fixed a stud carrying a double gear comprising preferably an integral combination of two gears, one of which designated as 24'' meshes with the previously mentioned gear 24' fixed to the shaft extension 24 of the pilot valve 21, and the other, a gear 24a which is meshed with a fourth gear 26' stationarily fixed on the concentrically disposed hollow hub 26'' of the main body portion of the gear casing 26. It can be seen that the shaft extension 24 extends through the hollow hub 26''.

When the hand wheel is rotated the combination gear is caused to revolve or roll around the fixed gear 26' and of course to rotate about its own axis of rotation as represented by the stud in the disk 23''. The rolling effect causes a driving action on the part of the gear 24'' with respect to its mating gear 24' on the pilot valve extension 24, and since as in the present case there are two less teeth in the gear 24'' as compared to the gear 24' (the gear 24a and the fixed gear 26'' have an equal number) the driven gear 24' is slowly driven in the same direction of rotation as that of the hand wheel 23. In the present gearing the gear 24'' has thirty-nine teeth, and one rotation of the hand wheel 23 causes a partial rotation of the pilot valve of $\frac{2}{39}$ of a turn, allowing an overall ratio of approximately 19.5 turns of the hand wheel to one turn of the pilot valve.

Mention is made later as to how sensitiveness in control is partly a result of gearing in step-down ratio and partly a result of the manner in which the coacting valve members 21 and 22 are ported for fluid flows. In any event it is usually preferable that the pilot valve 21 is caused to rotate in the same direction of rotation as the hand wheel 23 as is here taken care or by employing a driving gear 24″ smaller than the driven gear 24′.

The pilot valve 21 and follow valve 22 are enclosed in a tubular valve housing 27 which is attached to the rearward side of the gear casing 26, and since the forward end of the shaft extension 24 of the pilot valve extends into the gear casing, it is obvious that the longitudinal axis of the tubular valve housing 27 is co-axially disposed with reference to the gear casing. The rearward end of the valve housing 27 is closed with a head 28 secured by screws.

The follow valve 22 is snugly fitted for substantially oil-tight rotation in the bore of the valve housing 27. The follow valve is also tubular in form and is closed at one end (right hand end) by a head 30 secured with screws 31 (see Fig. 12 showing modification of invention). Projecting rearwardly from the head 30 is a stub shaft 30′ secured thereto in any suitable manner as by pinning as shown, the stub shaft 30′ passing through a centrally disposed opening in the rear head 28 of the valve housing. A gear 32 is fixed on the projecting rearward end of the stub shaft 30′ and meshes with a rack 32′ (Figs. 1 and 2) attached to the under side of the work-table 2 in parallel alignment with the direction of movement thereof.

The pilot valve 21 is snugly fitted for substantially oil-tight rotation in the centrally disposed bore of the follow valve 22. The pilot valve 21 is thus received in a sort of telescopic fit within the follow valve 22 while the follow valve 22 is itself also telescopically received within the central bore of the valve housing 27.

The coaction of the pilot valve 21 and follow valve 22 is by means of fluid admission and exhaust ports in the pilot valve which are rotated into or out of registry with passages in the follow valve 22 whereby an object of the invention is attained, i. e., that of using rotary motion of a hand-wheel or crank in work-table maneuvering. It will appear, however, that rotating out of registry is not so much the result of a positive action on the part of the operator as it is the result of a mere cessation of hand wheel rotation by the operator.

Since the fluid motor 5 must receive fluid in alternate ends to effect work-table reversals, there is provided in the pilot valve 21, two spaced apart regions or planes in which alternately interspersed admission and exhaust ports are located. These regions are located in planes transversely disposed to the longitudinal axis of rotation of the pilot valve and are represented by the lines on which the sections 5—5 and 6—6 are taken. Thus there is a group of admission ports in the plane at the section line 5—5 and a separate set of admission ports in the plane at the section line 6—6. Both groups are fed from a common source of fluid supply and each group controls the fluid flow to a particular end of the fluid motor. Interspersed with these admission ports are exhaust ports.

Admission ports indicated at 33 in the plane at the section 5—5, Figs. 5, 7 and 8, admit on proper registry with certain passages in the follow valve 22 a flow of fluid to the left hand end of the fluid motor 5. In the present instance three admission (and exhaust ports) are provided in each region. The advantage in employing a comparatively large number of ports lies in the fact that the capacity for flow is increased as the number of admission ports is increased. The planes are separated longitudinally as shown to prevent interchange of fluid by leakage therebetween.

Admission ports designated as 34, also three in number, are provided in the transverse plane at the section line 6—6 and control flow of fluid to the right hand end of the fluid motor 5. The relationship of these admission ports with passages in the follow valve 22 is as seen in Figs. 10, 5 and 6. Referring to Fig. 5 it will be seen that each admission port 33 is closed by the solid wall of the follow valve, the same condition being true with reference to each admission port 34 as seen in Fig. 6 which illustrates the section at the line 6—6.

When these ports are closed as just described, it indicates the work-table is in a state of rest. It can also be taken to mean that the closed condition is almost always a result of a previous work-table maneuvering.

Each of the three admission ports 33 is equidistantly spaced from each other, and each of the admission ports 34 is similarly spaced for the purpose of providing hydrostatic balance whereby the rotary movements of one valve relative to the other are free of any clamping effect.

The method of supplying fluid to the admission ports is taken up in a later part of the specification. This also applies to the manner in which the exhaust fluid is returned to the storage reservoir.

To direct a flow of fluid to an end of the fluid motor 5, for example, the left end, which will bring about a movement of the work-table to the right, the pilot valve 21 is rotated in a clock-wise direction by means of the hand wheel 23 and associated gearing. The pilot valve then assumes the position seen in Fig. 7, this being rotation relative to the follow valve 22. In this view it will be seen that each of the admission ports 33 has advanced to come into partial registry with an adjacent passage in the follow valve 22 designated as 36, whereupon fluid flows through each of the admission ports 33 in substantially equal quantities through the passages 36 as shown by the arrows, the passages 36 being also equidistantly spaced as are the admission ports 33. For the three admission ports there are three adjacent passages 36, and while it may be noticed that there are three other identical passages in this same region, it will appear later that these are exhaust passages interspersed between the passages 36.

All of the passages 36 (and these latter mentioned passages) communicate with a peripheral groove 38 formed in the exterior surface of the follow valve at this plane, i. e., the section 5—5 (Fig. 1 also). In alignment with this peripheral groove 38 is a threaded opening 39 in the valve housing 27 into which is threaded an end of the conduit 17 previously mentioned whereby the fluid is conducted to the left end of the fluid motor through the opened valve 17′. The groove 38 is a continuous peripheral groove for the purpose of providing hydrostatic balance.

Referring now to Fig. 10, the pilot valve 21 is here shown in position to direct a flow of fluid to the right hand end of the fluid-motor. As might be inferred this position is the result of an anti-clock-wise rotation of the pilot valve relative to the follow valve 22. The admission ports 34 of the group at the plane at the section 6—6 are now in partial registry with adjacent passages 37 in the follow valve 22 and as has been described in connection with the passages 36 the ports 37 are also equidistantly spaced whereby each passage 37 receives its share of the fluid flow.

For similar reasons for providing fluid balance the passages 37 communicate with a peripheral groove 41 formed in the manner as was described in connection with the similar groove 38. In the wall of the valve housing 27 is a threaded opening 42 in radial alignment with the groove 41 and into the opening 42 is threaded one end of the previously mentioned conduit 18 whereby fluid is conducted to the right hand end of the fluid-motor 5 through the valve 18' which is now in an opened position.

Inasmuch as any work-table movement in either direction causes a displacement of fluid from the end of the fluid motor opposite to that in which fluid is entering, it follows that provision must be made to carry away such displaced exhaust fluid. This is accomplished by providing exhaust ports in the pilot valve 21.

Like the admission ports, the exhaust ports are equidistantly spaced, but in the present instance the exhaust ports are positioned in a different phase relation with reference to the admission ports. The reason for the phase difference is that for convenience in manufacture the previously described passages in the follow valve 22 designated as 36 and 37 in the planes at the section lines 5—5 and 6—6 respectively are in longitudinal alignment (Fig. 1). Thus for each passage 36, Fig. 7, through which flows are being made, there is in longitudinal alignment therewith at the plane of the section 6—6 the similar passages 37, Fig. 9, through which fluid is not flowing at the time. Interspersed therewith, however, is a series of three passages 37' through which exhaust fluid is flowing into the exhaust ports 43 of the pilot valve, and these passages 37' are in alignment with similar passages 36', Fig. 7 again, which like the passages 37' are not passing fluid at the time. The admission ports 33 of the group at the plane of the section 5—5 are out of phase with the corresponding admission ports 34 of the series at the plane 6—6 as can be seen by comparing the full and broken line showing of these admission ports in any of the Figs. 5, 7 or 8. Any pair of admission ports 33 and 34 therefore straddle a pair of aligned follow valve passages 36 and 37 which same feature is also true in reference to the exhaust ports to be described which are seen to straddle pairs of aligned follow valve passages 36' and 37'.

Referring to Fig. 9 which is a companion figure to Fig. 7 in the sense that admission ports 33 are shown in registry in Fig. 7 with adjacent follow valve passages 36, it will be seen in Fig. 9 that exhaust ports 43 in the pilot valve 21 are in registry with the passages 37' of the follow valve 22. Therefore while fluid is flowing through the ports 33 to the left hand end of the fluid-motor 5 to cause a work-table movement to the right, the fluid displaced from the right hand end of the motor 5 is flowing in return flow through the passages 37' as shown by the arrows. In the same way Fig. 8 and Fig. 10 are companion figures, since in Fig. 10 the admission ports 34 of the series at the plane of the section 6—6 are in registry with the passages 37 of the follow valve 22 to direct a flow to the right hand end of the motor 5, while at the same time exhaust ports 44 in the pilot valve in the plane of the section at 5—5 are in registry with follow valve passages 36'. Arrows here also show the direction of flows.

It can be seen by the full and broken line showing of the admission ports 33 and 34 in Fig. 7 that fluid may flow only from the ports 33 since the ports 34 are at this time closed by the solid wall of the follow valve 22. Also, in reference to Fig. 8, where by a partial anti-clockwise rotation of the pilot valve, the ports 33 are at this time blanked by the follow valve and a flow is permitted only through the ports 34.

Referring to any of the Figures 5 to 10, inclusive, it will appear that the ports in the pilot valve are alternately fluid admission and exhaust ports. Thus taking Fig. 5 alone, a port 33 is an admission port and is between two exhaust ports 44, and vice versa. While the alternate spacing of admission and exhaust ports of each series taken together is not of equidistant spacing, nor for that matter are the ports alternated as might be inferred from the appearance of the full and broken line outlines in any of the Figures 5, 7 and 8, yet since the follow valve passages 36, 36', 37 and 37' are all equidistantly spaced, all admission or exhaust ports of a plane taken separately are equidistantly spaced from ports of the same character in the same plane. Therefore a partial rotation of the pilot valve 21 relative to the follow valve 22 insures that the correct admission ports are brought into registry while all others of the same character are blanked, while simultaneously with this registry the proper exhaust ports are brought into registry in the same amount with all other exhaust ports closed.

To provide sensitiveness, by which is meant that comparatively small partial rotations of the hand wheel 23 cause practically immediate response in work-table movement together with practically immediate reversal should the hand wheel be turned in the opposite direction, the admission ports and exhaust ports of a series are grouped together as best seen in any of the Figures 6, 9 and 10. These figures being of the section 6—6 have no broken line showing of ports, thereby confusion is avoided in explaining that a pair of admission and exhausts ports are so grouped as to come within the confines of two adjacent follow valve passages 37 and 37', whereby as seen in Fig. 6, a very small angular movement of the hand wheel changes the flow in the peripheral groove 41 from a pressure flow to an exhaust flow.

The spacing is in reality a compromise in design, for first in view of the higher pressures present in the admission ports it is essential that there shall be space between adjacent edges such as the edges 34' and 43' sufficiently ample to prevent a loss of fluid pressure due to leakage over the exterior surface of the pilot valve; and, secondly, to provide ample flow capacity, it is desirable to have ports as wide as possible measured peripherally; and, thirdly, for sensitivity in operation, to provide that such edges as the edge 34'' and 43'' (Fig. 6 only) are as closely adjacent as is consistently possible to the edges 37a of the follow valve passages. It can be seen that there is only a comparatively small space between a port edge 34'' and a passage edge 37a.

It will be understood that this explanation applies to all pilot valve ports and follow valve passages.

While sensitivity is obtainable as just described, the responsiveness as regards work-table movements is due possibly more to ample flow capacity than to any other one factor. It is clear that a plurality of ports does not merely divide the flow that is available but rather doubles or trebles the opportunity of the flow to enter the fluid motor. The device lends itself to another means for insuring ample volume of flow, that is, the ports may be elongated in the longitudinal direction of the pilot valve, with an equivalent elongation of the follow valve passages in the same manner. One method of forming the ports in the pilot valve is shown in Fig. 11. Inasmuch as the exhaust ports may be identical with admission ports, the reference character 33 employed in Fig. 11 should be construed as being applicable to all pilot valve exhaust and admission ports. The ports may be in the nature of a gash such as is made with a key-way cutter, the cutter being so disposed that the gash is suitably elongated in the longitudinal direction of the pilot valve.

By proper spacing of the exhaust ports these latter are caused to register in exactly the same amount as is noted for the admission ports. By thus placing a deterent on exhaust flows the quantity that can be admitted is affected since no more can be allowed to enter than is being permitted to escape from the fluid motor. Therefore, the pressure in the exhaust side up to the exhaust port is substantially equal to the inlet pressure and the entire hydraulic system leading to and from the hydraulic control device to the fluid motor, including the latter, is maintained in a state of tension whereby the "jumping" of the work-table is prevented.

As before mentioned in connection with Fig. 7 the pilot valve temporarily assumes the position shown in that figure. This means that whenever the pilot valve is given a partial clockwise rotation to the position as shown in Fig. 7 where admission ports 33 are in effective registry or where by an anti-clock-wise rotation admission ports 34 (Fig. 10) are put in effective registry that work-table movement will follow.

Referring now to Fig. 7, work-table movement will be toward the right since by a clock-wise rotation the ports 33 are permitting fluid flow to the left hand end and by the mechanical connection previously referred to consisting of the rack 32' on the table which is in mesh with the gear 32 it will be seen that follow valve rotation immediately follows work-table movement. Clockwise rotation of the follow valve therefore is made which is the same direction as that of the pilot valve. This means that if no further clockwise rotation of the pilot valve is made the follow valve passages 36 would soon cut off all flows through the admission ports 33, whereby all fluid directed to the left hand end of the fluid-motor would be cut off and work-table movement would cease. However, should the pilot valve rotation not be stopped but maintained the follow valve would continue rotation in the same direction and at a speed in direct relation to work-table speed. Since this speed is directly proportional to the amount of opening allowed so far as admission of the fluid is concerned the follow valve must rotate in synchronism with the pilot valve.

If the operator desires to accelerate the movement of the table he will rotate the hand wheel at a more rapid rate which for an instant is movement of the pilot valve relative to the follow valve resulting in a wider opening. This can be compared to a wider opening of an ordinary throttle valve, but with this difference, that to slow down he merely reduces the speed at which he rotates the hand wheel and to stop the table he merely ceases rotation of the hand wheel.

It can be seen that during movement there can be no independent acceleration of work-table movement faster than that allowed by the exhaust opening since any such more rapid movement would result in the displacement of more fluid than can escape through the exhaust ports. Also, any such jump of the work-table could temporarily convert the fluid motor into a pump, the suction of which would have to be satisfied indirectly through any admission ports open at the time.

Fluid from the pump under pressure enters the valve housing through a threaded opening 45 and passes into a peripheral groove 46 formed in the exterior surface of the follow valve 22 at the transverse plane represented by the section line 3—3, Figs. 1 and 3.

From the groove 46 the fluid passes through a plurality of radially disposed openings 47 in the follow valve into a peripheral groove 48 formed in the exterior surface of the pilot valve at the same plane. To carry the fluid to the several admission ports 33 and 34 there is provided a plurality of power passages indicated at 49. The power passages 49 are drilled in the solid body of the pilot valve 21 from the rearward end (see Fig. 1) forwardly to a point where the same will reach the series 33 of the admission ports at the plane of the section 5—5. There are in the present case three such power passages 49. The power passages are equidistantly spaced and parallel to the axis of rotation of the pilot valve and after drilling are permanently plugged at rearward or right end as shown by the dotted line plug 50 (see also Fig. 14).

Where the power passages pass under the peripheral groove 48 a short drilled opening is made to conduct flow of fluid from the groove 48 into the power passages 49. These short openings are indicated at 51 (Figs. 1 and 3). The fluid passes from the power passages 49 to the admission ports 33 and 34 by means of short drilled openings 52 and 53, the openings 52 being those that are to be found supplying those ports in the plane of the section 5—5 (see Fig. 5) while the drilled openings 53 are those to be found at the plane of the section 6—6 (see Fig. 6). In this manner one power passage supplies two admission ports as is best seen in Fig. 5 where the openings are shown in full and broken lines.

The exhaust passages are formed in substantially identical manner. Referring to Fig. 5, three longitudinally aligned exhaust passages 54 are provided in the main body of the pilot valve in interspersed relation with the power passages 49. These exhaust passages 54 are drilled openings and are plugged at the rear end in the same manner as was described for the power passages 49. The exhaust passages communicate with the exhaust ports 44 of the pilot valve in the same manner as the power passages, there being for each exhaust port in the group at the section 5—5 a short drilled opening 55 and for each exhaust port 43 in the group at the section 6—6 a similar short drilled opening 56. In this manner one exhaust passage 54 accommodates two exhaust ports 43 and 44.

In the pilot valve at the plane of the section 4—4 there is provided a peripheral groove 57 at the bottom of which short drilled openings 58 place this groove in communication with the exhaust passages 54 (see Fig. 4). The exhaust fluid flows from the groove 57 through radially disposed openings 59 in the follow valve 22 to a peripheral groove 60 formed in the exterior surface of the follow valve in the same manner as was described in connection with groove 46. The relation of the pressure groove 46 and exhaust groove 60 at the sections 3—3 and 4—4 respectively and the previously described grooves 38 and 41 at the sections 5—5 and 6—6 respectively is best seen in Fig. 1 in which view it is seen that all of these grooves are spaced apart a distance sufficiently great to avoid leakage from one groove to another or to the exterior of the device. From the exhaust fluid groove 60 the fluid is conducted to the storage reservoir 13 by means of the conduit 20, one end of which is threaded in the exterior wall surface of the valve housing 27 in radial alignment with the exhaust fluid groove 60 at the threaded opening 60'.

Modified form

In the operation of certain types of machines in which a device very similar to the device just described may be installed, it may at times be desirable to provide that the movable member may be moved in an emergency by the device itself and without hydraulic pressure aid, such an emergency being occasioned for example by a pump or motor failure.

For such applications, the device may take on a slightly altered form, one such being shown herein as a modification. In the foregoing specification, the description covered the design as shown in Figs. 1 to 11, inclusive, in which there was no connection between the valving parts 21 and 22 other than the telescopic envelopment of the hand valve by the follow valve. Each valve could be rotated independently of the other.

The advantage of this form of construction is that when the work-table is moved as by power supplied through any of the conventional hydraulic automatic reciprocating systems, the hand wheel will not rotate in response to work-table reciprocations. The follow valve is the only rotating member during such time, the inertia of the hand wheel usually being sufficient to prevent rotation of the pilot valve 21.

The difference between the form just described and the modified form consists in the provision of a plurality of equally spaced, coaxially disposed lugs 61 preferably integrally attached to the rearward end of the pilot valve 21' of the modification (right hand end, Fig. 14) in such position as to coact, as a form of jaw clutch, with an equivalent number of equally spaced lugs 62 projecting forwardly from the forward side (left side, Fig. 1) of the head 30' corresponding to the head 30 of the follow valve 22 of the first form.

It is preferable that the number of the lugs is equal to the number of admission ports in any one group. That is, since in the device previously described, three admission ports are employed, three lugs each are provided in the plurality of lugs on the rear end of the pilot valve and adjacent forward side of the follow valve head.

The disposition of the lugs on the pilot valve as regards angular relationship with the follow valve of the modification is such that when all admission and exhaust ports are out of registry (see Figs. 5 and 6 as an illustration) a lug 61 on the pilot valve is midway between two lugs 62 on the follow valve (see Fig. 12).

There is thus provided a clutching arrangement connecting the pilot and follow valves of the modification but it should be made clear that a certain amount of angular "float" between one valve and the other is desirable. This float, or back-lash is obtained by so proportioning the lugs 61 as to not entirely fill the spaces between coacting lugs 62 whereby in the normal control of the machine under hydraulic pressure, the float represented as the two angles Y and Y', Fig. 12, does not interfere with obtaining registry of ports when the hand valve is given a partial rotation in either direction. Beyond full registry a lug may actually come in contact with an adjacent coacting lug, but it is not likely that this will occur, since it is evident that even a partial registry will cause work-table movement, and by the mechanical connection of the rack and gear, such movement will carry a coacting lug 62 of the modified follow valve away from the lug 61 on the modified pilot valve 22'.

For emergency movement when there is no pressure in the system the operator rotates the hand wheel, thereby taking up the float on one side and the manual power of the operator is then transmitted through the lugs and rack-and-gear to move the work-table. Inasmuch as taking up the float puts all ports in registry, it is clear that work-table movement during emergency periods is not resisted by fluid displaced from the end of the fluid-motor toward which the piston thereof is moving, since such displaced fluid will find exhaust ports leading to atmosphere opened to it. Since the fluid motor is acting as a pump during the emergency periods, the other end of the fluid motor must be bled, since movement becomes a suction stroke. This bleeding is easily done by opening a pet-cock, here shown at 63, Fig. 2.

With the modified construction it is evident that, acting as the sole means of moving the work-table, the device is effective both when given the aid of hydraulic pressure in controlling table movements and also in the emergency periods. However, if at some time automatic power or hydraulic table reciprocation is resorted to, the rotation of the hand wheel might be objectionable, to overcome which any of a number of expedients are available, a simple one being to remove the gear 32 from the machine by first removing the nut 32''.

In the assembly of the first form described it is not necessary to use any precautions in regard to placing the pilot valve in any particular relation with reference to the follow valve. While either may rotate independently of the other at a time when there is no pressure in the hydraulic system, yet at the instant that pressure is supplied the device automatically assumes a closed position if the pilot valve is in a state of rest.

This is explained in this way: Should any admission port be opened at a time when the hydraulic system is charged with fluid under pressure as by starting the pump the work-table will make a slight movement in one direction or the other to immediately cut off the fluid that caused the movement and the device is then ready to control all subsequent movements in either direction of movement by the rotation of the hand wheel in the desired direction. This explanation is applicable also to the device shown as a modified form.

When a device constructed according to the first form or to the modified form is employed as an adjunct in an existing hydraulic system of any of the well known types of automatic forms, not shown in the present application, the elements that are common to such systems are the fluid-motor 5 and portions of the conduits 17 and 18. When the device is operating under an automatic system, in which the work-holder is reciprocated automatically by fluid under the control of a work-holder operated reversing valve, the control devices not shown of that system may be connected at the branches 17" and 18" and to avoid any loss of pressure through the hand control devices it is advisable to isolate the hand control hydraulic system by closing the valves 17' and 18' previously referred to.

In each form drains are provided at the front and rear ends of the pilot and follow valves leading to atmosphere to prevent binding of valves. Such drains are indicated at 64 and 65, Fig. 1.

Having thus described my invention, I claim:

1. In a machine of the character described, a movable member, a fluid motor for operating said member including a cylinder and piston, a hand-operated rotary cylindrical valve having a plurality of sets of ports located in one transverse plane and also a plurality of sets of ports located in another transverse plane, the ports of each set being two in number and spaced apart in a circumferential direction, one of the ports of each set being an exhaust port and the other one a supply port, the ports of each set in one transverse plane being arranged reversely circumferentially with regard to supply and exhaust to the ports of each set in the other transverse plane, a rotary motor-operated valve journaled on said hand-operated valve and operatively connected with said motor, said motor-operated valve having an annular channel for the sets of ports which are located in one transverse plane and another annular channel for the sets of ports which are located in the other transverse plane, said channels communicating respectively with the cylinder of said motor on opposite sides of the piston thereof, said motor-operated valve having two ports for each set of ports in said hand-operated valve communicating with said channels, each set of supply and exhaust ports in said hand-operated valve when the motor is at rest being between two of the ports of the motor-operated valve so as to be closed by the wall of said motor-operated valve but being closely positioned respectively to said last-mentionel ports, whereby when said hand-operated valve is slightly rotated the supply ports located in one transverse plane therein will be opened and the exhaust ports located in the other transverse plane therein will be opened to admit and exhaust fluid to and from said motor and when said motor-operated valve is rotated all ports in said hand-operated valve therein will be quickly brought in registry with the wall of said motor-operated valve between the ports therein to prevent exhaust from and supply to the motor cylinder and thereby arrest further movement of its piston by providing a fluid lock for said piston.

2. In a machine of the character described, a movable member, a fluid motor for operating said member including a cylinder and piston, a hand-operated rotary cylindrical valve having a plurality of sets of ports located in one transverse plane and also a plurality of sets of ports located in another transverse plane, the ports of each set being two in number spaced apart in a circumferential direction, one of the ports of each set being an exhaust and the other one a supply port, the ports of each set in one transverse plane being arranged reversely circumferentially with regard to supply and exhaust to the ports of each set in the other transverse plane, said hand-operated valve having a plurality of longitudinally extending interior supply passages for all the supply ports and also a plurality of longitudinally extending interior passages for all the exhaust ports, a rotary motor-operated valve journaled on said hand-operated valve and operatively connected with said motor, said motor-operated valve having an annular channel for the sets of ports which are located in one transverse plane and another annular channel for said sets of ports which are located in the other transverse plane, said channels communicating respectively with the cylinder of said motor on opposite sides of the piston thereof, said motor-operated valve having two ports for each set of supply and exhaust ports in said hand-operated valve communicating with said channels, each set of supply and exhaust ports in said hand-operated valve when the motor is at rest being between two of the ports of the motor-operated valve so as to be closed by the wall of said motor-operated valve but being closely positioned respectively to said last-mentioned ports, said motor-operated valve also having an annular fluid supply channel in communication with said interior passages of said hand-operated valve and also having an annular exhaust channel in communication with the interior exhaust passages of said hand-operated valve, whereby when said hand-operated valve is slightly rotated the supply ports thereof located in one transverse plane therein will be opened to supply fluid from said interior supply passages and the exhaust ports located in the other transverse plane therein will be opened to the exhaust passages in said hand-operated valve to admit and exhaust fluid to and from said motor and when said motor-operated valve is rotated all ports of said hand-operated valve will be quickly brought in registry with the wall of said motor-operated valve to arrest the piston of said motor by providing a fluid lock for said piston.

3. In a machine of the character described, a movable member, a fluid motor for operating said member including a cylinder and piston, a hand-operated rotary cylindrical valve having a plurality of supply ports and a plurality of exhaust ports located in one transverse plane and also a plurality of supply and exhaust ports located in another transverse plane, the supply and exhaust ports in each transverse plane being alternately arranged and equal in number, the ports in one transverse plane being reversely arranged to the ports in another transverse plane with regard to supply and exhaust, a rotary motor-operated valve journaled on said hand-operated valve and operatively connected with said motor, said motor-operated valve having an annular channel corresponding to the ports of said hand-operated valve which are located in one transverse plane and another annular channel corresponding to the ports of said hand-operated valve which are located in the other transverse plane, said channels communicating respectively with the cylinder of said member on opposite sides of the piston thereof, said motor-operated valve having a plurality of alternately arranged supply and exhaust ports to cooperate with the ports of said hand-operated valve which are located in one transverse plane therein and also a plurality of alternately arranged supply and exhaust ports to cooperate with the ports of said hand-operated valve which are located in the other transverse plane thereof, the ports of said motor-operated valve leading to the said channels, the ports in said hand-operated valve when the motor is at rest being closely positioned to the corresponding supply and exhaust ports of said motor-operated valve but entirely closed by the wall of said motor-operated valve, whereby when said hand-operated valve is slightly rotated the supply ports located in one transverse plane therein will be opened and the exhaust ports located in the other transverse plane thereof will be opened to admit and exhaust fluid to and from said motor and when said motor-operated valve is rotated all ports in said hand-operated valve will be quickly brought in registry with the wall of said motor-operated valve to prevent exhaust and supply to the motor cylinder and thereby arrest further movement of its piston by providing a fluid lock for said piston.

WILLIAM G. BALDENHOFER.